US008638516B2

(12) United States Patent
Lin et al.

(10) Patent No.: US 8,638,516 B2
(45) **Date of Patent: *Jan. 28, 2014**

(54) SYSTEM AND METHOD FOR IMPROVED FREE FALL DETECTION

(71) Applicant: Dell Products, LP, Round Rock, TX (US)

(72) Inventors: Hsien Tsung Lin, Shin-Chuang (TW); Jih Hsin Pan, Tu-Cheng (TW)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,507

(22) Filed: Dec. 21, 2012

(65) Prior Publication Data

US 2013/0107394 A1 May 2, 2013

Related U.S. Application Data

(63) Continuation of application No. 12/897,328, filed on Oct. 4, 2010, now Pat. No. 8,363,344.

(51) Int. Cl.

| | |
|---|---|
| ***G11B 15/04*** | (2006.01) |
| ***G11B 19/04*** | (2006.01) |
| ***G11B 21/02*** | (2006.01) |

(52) U.S. Cl.
USPC .............................................. 360/60; 360/75

(58) Field of Classification Search
None
See application file for complete search history.

(56) References Cited

U.S. PATENT DOCUMENTS

| | | | |
|---|---|---|---|
| 5,982,573 | A | 11/1999 | Henze |
| 7,872,827 | B2 | 1/2011 | Shu et al. |
| 2001/0007205 | A1 | 7/2001 | Urano et al. |
| 2005/0223784 | A1 | 10/2005 | Takeda et al. |
| 2006/0070439 | A1 | 4/2006 | Kwon et al. |
| 2006/0152842 | A1 | 7/2006 | Pasolini et al. |
| 2006/0179916 | A1 | 8/2006 | Umeda |
| 2006/0260398 | A1 | 11/2006 | Umeda |
| 2007/0109679 | A1 | 5/2007 | Han et al. |
| 2007/0120528 | A1 | 5/2007 | Burgan et al. |
| 2007/0188969 | A1 | 8/2007 | Lasalandra et al. |
| 2010/0010771 | A1 | 1/2010 | Ikkink et al. |
| 2012/0081812 | A1 | 4/2012 | Lin et al. |

*Primary Examiner* — Regina N Holder
(74) *Attorney, Agent, or Firm* — Larson Newman, LLP

(57) ABSTRACT

An information handling system includes a free fall sensing system having an amplifier and sampling circuit, a sampling data analyzer, a sampling clock duration controller, and a sampling clock generator. The amplifier and sampling circuit is configured to sample data signals from the free fall sensor based on an initial sampling signal and based on a variable sampling signal. The sampling data analyzer is configured to compare a magnitude of sampled data point to a predetermined magnitude, to output an alert signal when the magnitude of the sampled data point is below the predetermined magnitude. The sampling clock duration controller is configured to vary a duration and a frequency of a sampling signal control in response to the alert signal. The sampling clock generator is configured to send a variable sampling signal to the amplifier and sampling circuit in response to the variation of the duration and the frequency of the sampling signal control.

20 Claims, 6 Drawing Sheets

SYSTEM AND METHOD FOR IMPROVED FREE FALL DETECTION

CROSS REFERENCE TO RELATED APPLICATIONS

This application is a continuation of U.S. patent application Ser. No. 12/897,328, entitled "System and Method for Improved Free Fall Detection," filed on Oct. 4, 2010, the disclosure of which is hereby expressly incorporated by reference in its entirety.

FIELD OF THE DISCLOSURE

This disclosure relates generally to information handling systems, and more particularly relates to system and method for improved free fall detection.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a portable computer, may include a free fall sensor to mitigate damage to a hard disk drive when the portable computer falls. When the free fall sensor detects that the portable computer is experiencing a free fall event, circuits and/or modules within the portable computer can stop read/write operations for the hard disk drive and lock down a read/write head of the hard disk drive to prevent the read/write head from scratching the hard disk drive during the fall.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
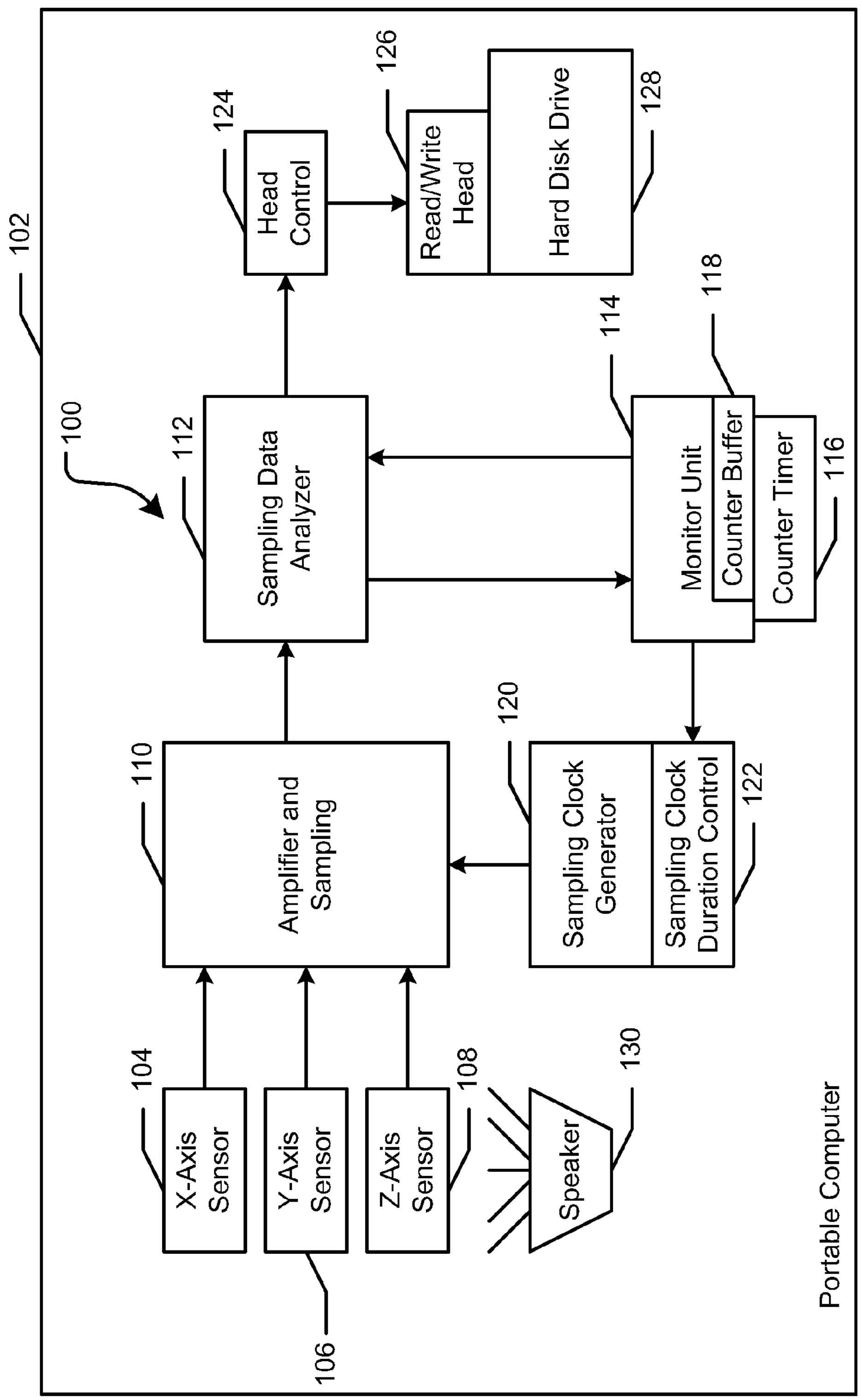
FIG. 1 is a block diagram of a free fall sensing system of an information handling system.

FIG. 1 shows a free fall sensing system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The free fall sensing system 100 includes free fall sensors 104, 106, and 108, an amplifier and sampling module 110, a sampling data analyzer 112, a monitor unit 114, a counter timer 116, a counter buffer 118, a sampling clock generator 120, and a sampling clock duration controller 122. The free fall sensors 104, 106, and 108 are in communication with the amplifier and sampling module 110, which in turn is in communication with the sampling data analyzer 112. The sampling data analyzer 112 is in communication with the monitor unit 114, which in turn is in communication with the counter timer 116. The monitor unit 114 can be in communication with the counter buffer 118, or the counter buffer can be located within the monitor unit. The monitor unit 114 is in communication with the sampling clock generator 120 and with the sampling clock duration controller 122. The sampling clock duration controller 122 can be in communication with the sampling clock generator 120, or the sampling clock duration controller 122 can be part of the sampling clock generator 120. The sampling data analyzer 112 is in communication with a head control circuit 124, which in turn is in communication with a read/write head 126 of a hard disk drive 128. Each of free fall sensors 104, 106, and 108 preferably detect motion of the information handling system or portable computer 102 along a different directional axis. For example, the free fall sensor 104 can detect movement along the X-axis, the free fall sensor 106 can detect movement along the Y-axis, and the free fall sensor 108 can detect movement along the Z-axis. In one embodiment, the sensors 104, 106, and 108 may be integrated into an accelerometer.

During operation, the free fall sensors 104, 106, and 108 can send data signals to the amplifier and sampling circuit 110 in response to detecting movement of or vibrations in the information handling system 102. The amplifier and sampling circuit 110 can take a reading and/or a sample of the data signals at a particular sampling rate set by the sampling clock generator 120. The sampling clock duration controller 122 can set an initial sampling duration, such that the sampling clock generator 120 can provide the amplifier and sampling circuit 110 with an initial sampling signal that has a fixed frequency and a fixed duration between pulses of the initial sampling signal. For example, the initial sampling signal can have a fixed duration between pulses of two and a half milliseconds, and a fixed frequency of around four hundred hertz. The amplifier and sampling circuit 110 can sample the data signals from the free fall sensors 104, 106, and 108 and determine a magnitude of the sampled data point from the data signals in response to detecting each pulse of the sampling signal received from the sampling clock generator 120.

The amplifier and sampling circuit 110 can send the sampled data point to the sampling data analyzer 112, which in turn can compare each magnitude of the sampled data points to a predetermined magnitude. The predetermined magnitude can be a magnitude of a sampled data point that indicates that the information handling system 102 is experiencing a free fall event. When the magnitude of the sampled data point is below the predetermined magnitude the sampling data analyzer 112 can output an alert signal. The monitor unit 114 can set the counter buffer 118 to a high voltage level and can start the counter timer 116 in response to receiving the alert signal. When the counter timer 116 is started, the monitor unit 114 can send a vary sampling request signal to the sampling clock duration controller 122. The vary sampling request signal can cause the sampling clock duration controller 122 to vary the sampling duration between the pulses of the sampling signal to slightly more or slightly less than the initial duration. The variation in the duration between the pulses can be different between each set of pulses of the sampling signal. The variation in the sampling duration can cause the sampling clock generator 120 to vary when a pulse is generated on the sampling signal. The amplifier and sampling circuit 110 can sample the data signals from the free fall sensors 104, 106, and 108 at each pulse of the variable sampling signal from the sampling clock generator 120, and can send the sampled data point to the sampling data analyzer 112.

The sampling data analyzer 112 can again compare the magnitude of the sampled data point to the predetermined magnitude, and can continue to send the alert signal to the monitor unit 116 if the magnitude of each of the sampled data points is below the predetermined magnitude. The monitor unit 114 can keep the counter buffer 118 at the high voltage level while the magnitude of the sampled data point is below the predetermined magnitude. However, if the magnitude of the sampled data point is above the predetermined magnitude, the monitor unit 114 can clear the counter buffer 118 to a low voltage level.

When the counter timer 116 expires, the monitor unit 114 can determine whether the counter buffer 118 is at the high voltage level or at the low voltage level. If the counter buffer 118 is at the low voltage level when the counter timer 116 expires, the monitor unit 114 can determine that the information handling system 102 is not in free fall, and that the free fall sensing system 100 can be reset to await the next data signals from the free fall sensors 104, 106, and 108. Alternatively, if the counter buffer 118 is at the high voltage level when the counter timer 116 expires, the monitor unit 114 can determine that the information handling system 102 is in free fall, and can output a lock down signal to the sampling data analyzer 112. The lock down signal can then be sent to the head control circuit 124, which in turn can stop a read/write operation of the read/write head 126 and lock the read/write head in a secure location in preparation for the free fall of the information handling system 102. After the read/write head 126 has been locked for a predetermined amount of time, the free fall sensing system 100 can then be reset to await the next data signals from the free fall sensors 104, 106, and 108.

When the free fall sensors 104, 106, and 108 detect movement, the free fall sensors can output a low level data signal, such that the magnitude of the data signal is below the predetermined magnitude in the sampling data analyzer 112. Thus, during a free fall event, the sampled data point from the amplifier and sampling circuit 110 can be continually below the predetermined magnitude from the time the counter timer 116 starts until the counter timer expires. Therefore, during a free fall event the sampling data analyzer 112 can lock down the read/write head 126 of the hard disk drive 128 when the counter timer 116 expires.

However, a user of the information handling system 102 can utilize a speaker 130 of the information handling system 102 to generate sound, and the sound may cause vibrations in the free fall sensing system 100. The vibrations in the free fall sensing system 100 from the sound can be substantially the same frequency as the fixed frequency of the initial sampling signal. If the vibrations in the free fall sensing system 100 from the sound are strong enough and if the magnitude of the sampled data point is below the predetermined level, then the sampling data analyzer 112 can detect a false free fall event and can lock down the read/write head 126 of the hard disk drive 128. For example, the speaker 130 can be a sub-woofer or the like that is designed to amplify audio in a low frequency range, such as three hundred to six hundred hertz. If the fixed frequency of the initial sampling signal is around four hundred hertz, the fixed frequency can be within the frequency range of the sound from the speaker 130. Thus, the frequency of the amplified sound can be sampled by the amplifier and sampling circuit 110, such that the magnitude of the sampled data point can be below the predetermined magnitude when measured by the sampling data analyzer 112. Thus, sound generated by the speaker 130 of the information handling system 102 can cause a false free fall detection if the frequency and duration between pulses of the sampling signal are not varied and are substantially equal to that of the sound.

Figure 2:
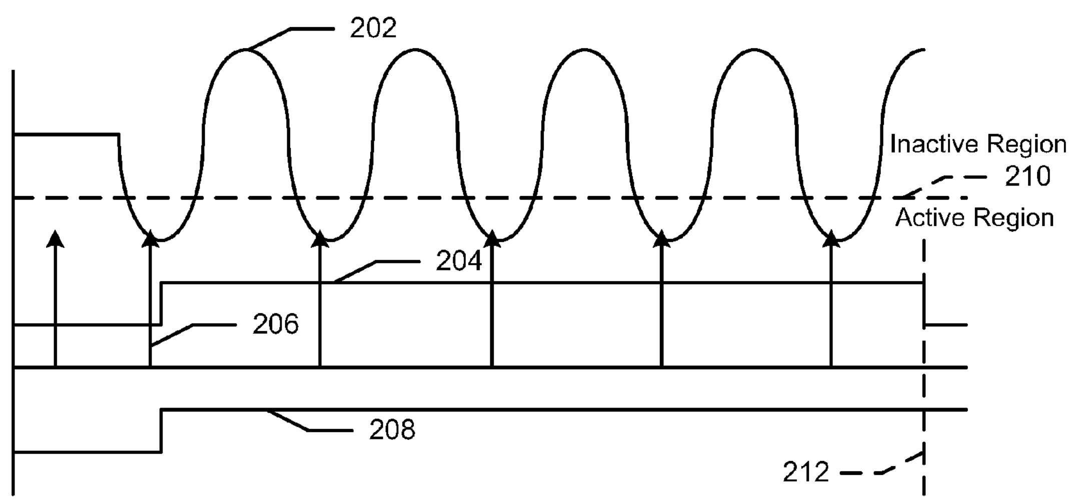
FIG. 2 is a graph of a plurality of waveforms associated with the free fall sensing system.

FIG. 2 shows a particular embodiment of a plurality of waveforms associated with the free fall sensing system 100 when the sampling signal duration is constantly set at the initial duration. The plurality of waveforms includes a sound vibrations waveform 202, a counter timer waveform 204, a sampling signal waveform 206 with a plurality of pulses, and counter buffer waveform 208. The sound vibrations waveform 202 can be the vibrations caused in the free fall sensor when the user of the information handling system 102 is utilizing the speaker 130 to generate sound. The counter timer waveform 204 can be set to a high voltage level when a magnitude of a first sampled data point is detected below the predetermined magnitude 210, and the counter timer waveform can be set to a low voltage level when the counter time has expired.

The sampling signal waveform 206 preferably has a constant frequency and duration, and can have substantially the same frequency as the sound vibrations waveform 202. The counter buffer waveform 208 can be set to a high voltage level when the first sampled data point is detected below the predetermined magnitude 210. If the frequency of sampling signal waveform 206 is substantially equal to the frequency of the sound vibrations waveform 202, as shown in FIG. 2, the sampling data can be below the predetermined magnitude 210 at each pulse of the sampling signal waveform. Thus, when the counter timer expires, as indicated by dashed line 212, the counter timer waveform 204 is set to the low voltage level, and the counter buffer waveform 208 can still be set to the high voltage level. In this situation, when the counter buffer waveform 208 is at the high voltage level a false free fall event detection can be created. The sampling data analyzer 112 can then cause the read/write head 126 to be improperly locked down, based on the false free fall detection.

Figure 3:
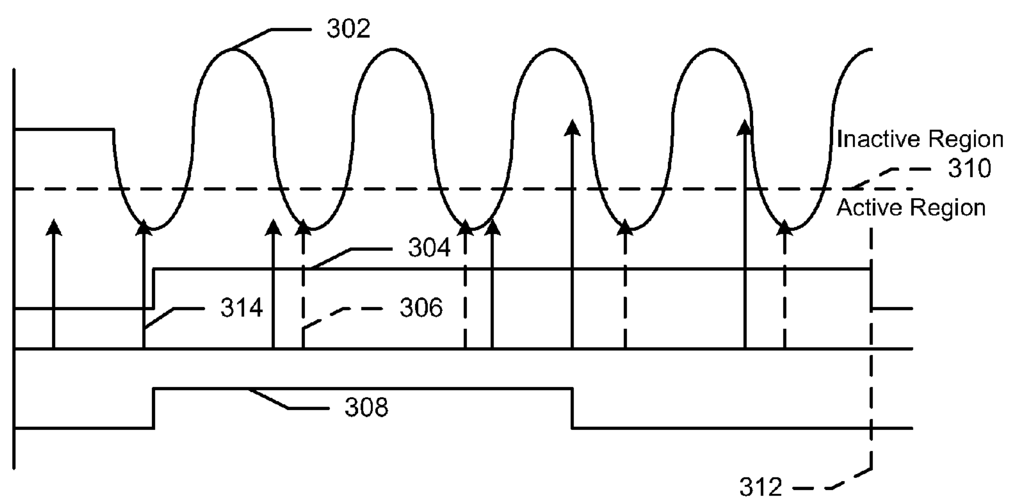
FIG. 3 is a graph of an alternative plurality of waveforms associated with the free fall sensing system.

FIG. 3 shows a particular embodiment of a plurality of waveforms associated with the free fall sensing system 100 when sampling clock duration controller 122 varies the sampling signal duration. The plurality of waveforms includes a sound vibrations waveform 302, a counter timer waveform 304, a sampling signal waveforms 306 and 314 each with a plurality of pulses, and counter buffer waveform 308. The sound vibrations waveform 302 can be the vibrations caused in the free fall sensor when the user of the information handling system 102 is utilizing the speaker 130 to generate sound. The counter timer waveform 304 can be set to a high voltage level when a magnitude of a first sampling data is detected below the predetermined magnitude 310, and can be set to a low voltage level when the counter timer expires at line 312. The sampling signal waveform 306 preferably has a number of pulses with a constant frequency and a constant duration between the pulses, and the frequency and duration between the pulses may have substantially the same frequency as the sound vibrations waveform 302. However, the sampling signal waveform 314 preferably has a number of pulses with a variable frequency and a variable duration between the pulses, and the frequency and duration between the pulses can vary from the frequency and duration of the sampling signal waveform 306 and the sound vibrations waveform 302.

The sampling signal waveform 314 is preferably used when a magnitude of a first sampled data point is below the predetermined magnitude 310 has been detected. The counter buffer waveform 308 can be set to a high voltage level when the magnitude of the first sampled data point is detected below the predetermined magnitude 310. The sound vibrations waveform 302 can then be sampled based on the sampling signal waveform 314 with the variable frequency and the variable duration between the pulses of the sampling signal waveform. When the magnitude of the sampled data point of the sound vibrations waveform 302 is above the predetermined magnitude 310, the counter buffer 308 is preferably set to a low voltage level. Thus, when the counter timer expires, as indicated by the dashed line 312, the counter timer waveform 304 is set to a low voltage level, and the counter buffer waveform 308 can be at the low voltage level indicating that a free fall event has not been detected. The sampling data analyzer 112 can then preferably not lock down the read/write head 126, based on the counter buffer waveform 308 having the low voltage level.

Figure 4:
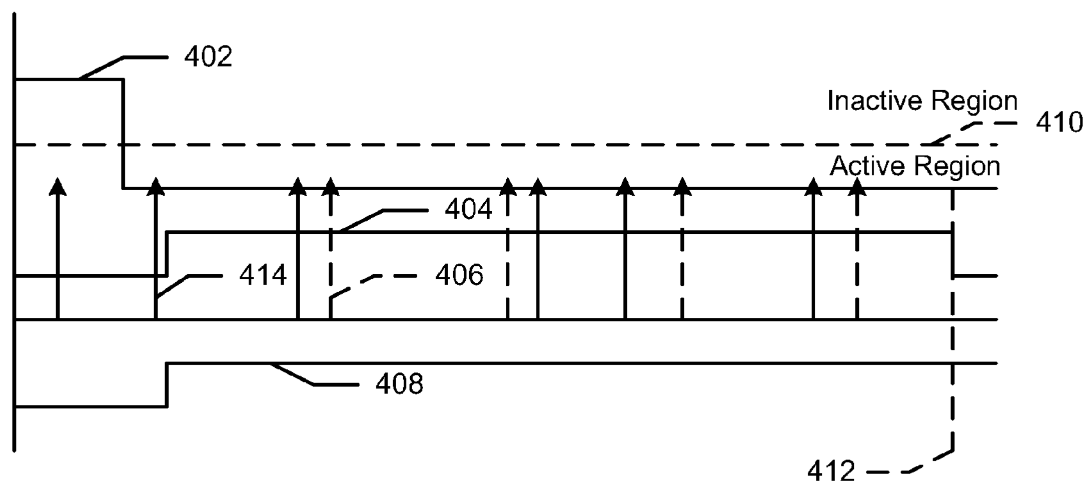
FIG. 4 is a graph of another alternative plurality of waveforms associated with the free fall sensing system.

FIG. 4 shows a particular embodiment of a plurality of waveforms associated with the free fall sensing system 100 when sampling clock duration controller 122 varies the sampling signal duration. The plurality of waveforms includes a free fall detection waveform 402, a counter timer waveform 404, a sampling signal waveforms 406 and 414, and counter buffer waveform 408. The free fall detection waveform 402 can be received from one of the free fall sensors 104, 106, or 108. The counter timer waveform 404 can be set to a high voltage level when a magnitude of a first sampling data is detected below the predetermined magnitude 410, and can be set to a low voltage level when the counter timer expires at line 412. The sampling signal waveform 406 preferably has a number of pulses with a constant frequency and a constant duration between the pulses, and the frequency and duration between the pulses. However, the sampling signal waveform 414 preferably has a number of pulses with a variable frequency and a variable duration between the pulses, and the frequency and duration between the pulses can vary from the frequency and duration of the sampling signal waveform 406.

The counter buffer waveform 408 can be set to a high voltage level when the magnitude of the first sampled data point is detected below the predetermined magnitude 410. If the information handling system 102 is moving in one of the directions of the free fall sensors, the free fall detection waveform 402 is preferably continually below the predetermined magnitude 410. Thus, when the counter timer expires, as indicated by dashed line 412, the counter timer waveform 404 is set to a low voltage level, and the counter buffer waveform 408 can still be set to the high voltage level indicating a free fall event. The sampling data analyzer 112 can then lock down the read/write head 126, based on the counter buffer waveform 408 having the high voltage level.

Figure 5:
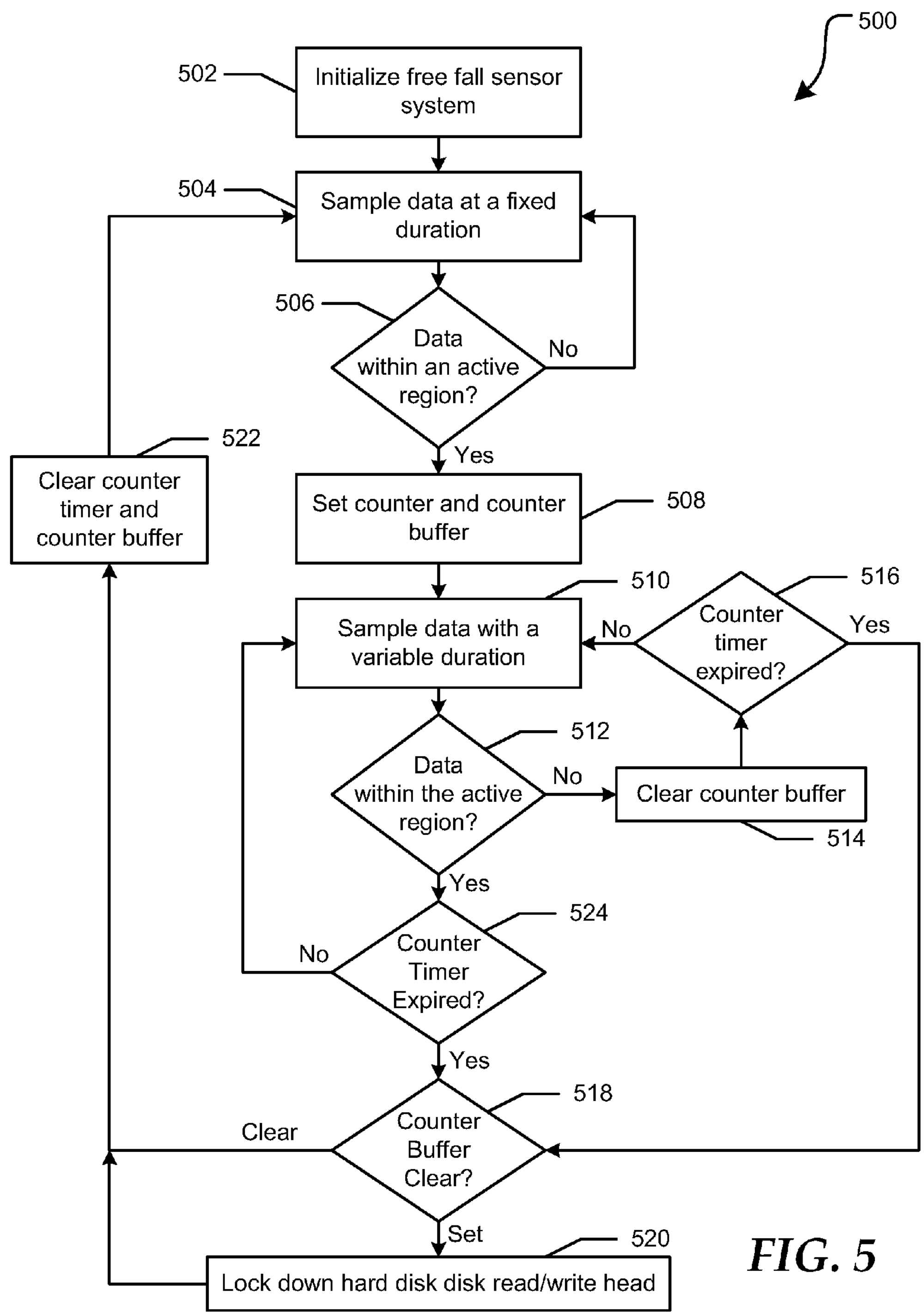
FIG. 5 is a flow diagram of a method for minimizing false free fall detections.

FIG. 5 shows a flow diagram of method 500 for minimizing false free fall detections. At block 502, free fall sensor system is initialized. The free fall sensor system can receive free fall sensor data from any of a number of sensors that detect movement in an information handling system 102. The sensors can also send false free fall sensor data in response to vibrations of the information handling system 102 and the free fall sensors from sound generated in the information handling system. The free fall sensor data is sampled at block 504. The free fall sensors can be sampled in response to a number of pulses in a sampling signal. At block 506, a determination is made whether a magnitude of the sampled data point is within an active region. The active region can be set such that a movement of the information handling system 102 can cause the magnitude of the sampled data point to enter the active region. In one embodiment, the active region can be when the magnitude of the sampled data point is below a predetermined magnitude. In another embodiment, the active region can be when the magnitude of the sampled data point is above a predetermined magnitude.

When the magnitude of the sampled data point is not within the active region, the flow can repeat as stated above at block 504. When the magnitude of the sampled data point is within the active region, a counter timer and a counter buffer are both set to a high voltage level at block 508. At block 510, the free fall data is sampled based on a sampling signal having a variable frequency and a variable duration between the pulses of the sampling signal. The variable duration between the pulses can be more or less that the fixed duration between the pulses. At block 512, a determination is made whether the magnitude of the sampled data point taken based on the variable sampling signal is within the active region. If the magnitude of the sampled data point is not within the active region, the counter buffer is cleared at block 514. The counter buffer can be cleared by setting the counter buffer to a low voltage level. At block 516, a determination is made whether the counter timer has expired. If the counter timer has not expired the flow repeats as stated above at block 510. However, if the counter timer has expired, a determination is made whether the counter buffer is cleared at block 518.

If the counter buffer is not cleared, a read/write head of a hard disk drive is locked down at block 520. At block 522, the counter timer and the counter buffer are cleared. When the counter timer and the counter buffer are clear, the system resets and the flow repeats as stated above at block 504. Referring back to block 512, if the sampled data point is within the active region, a determination is made whether the counter timer has expired at block 524. If the counter timer not has expired the flow repeats as stated above at block 510. If the counter timer has expired the flow repeats as stated above at block 518.

Figure 6:
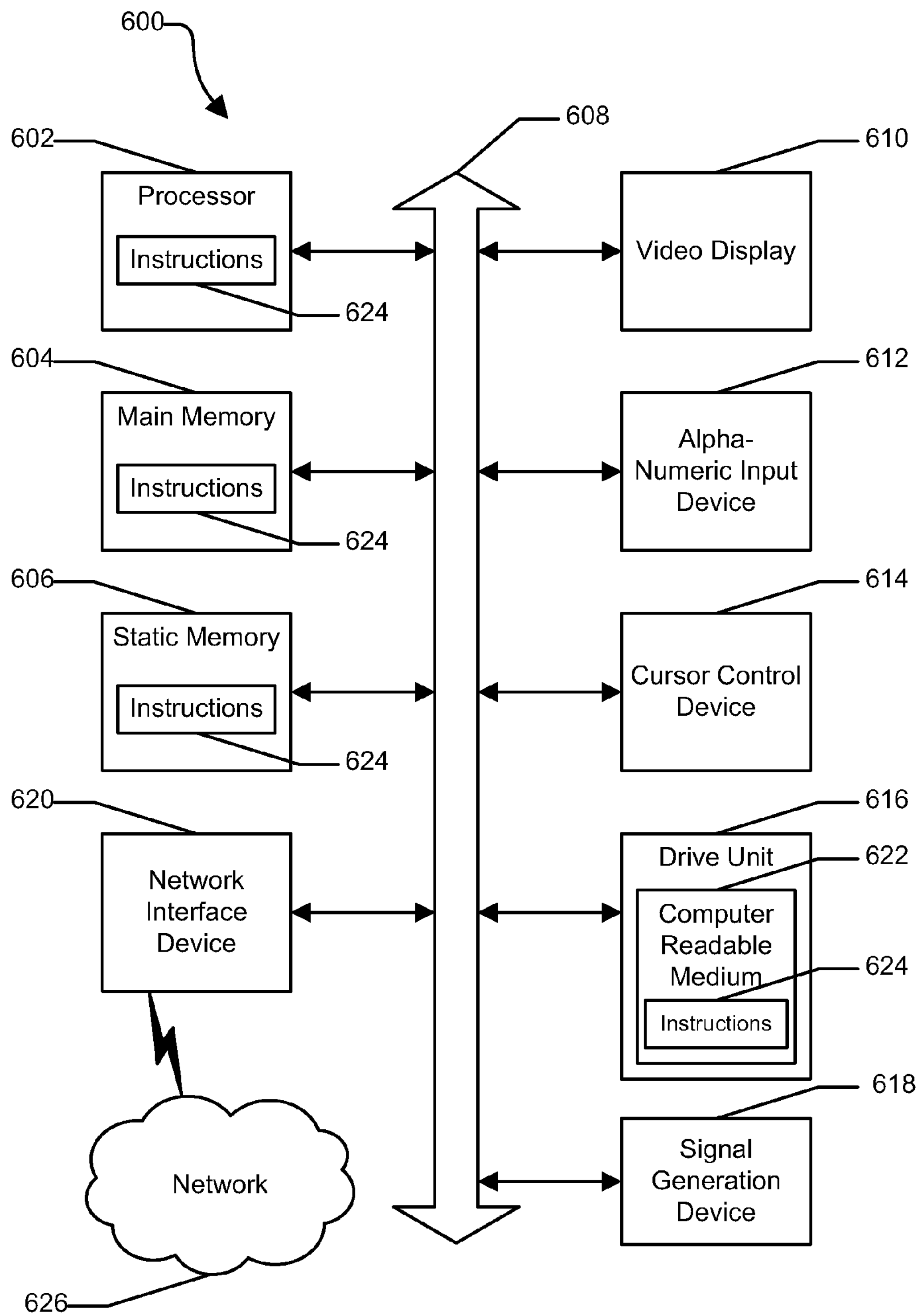
FIG. 6 is a block diagram of a general computer system.

FIG. 6 shows an illustrative embodiment of a general computer system 600 in accordance with at least one embodiment of the present disclosure. The computer system 600 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602 such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624 such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

a free fall sensor configured to detect movement in the information handling system;

an amplifier and sampling circuit in communication with the free fall sensor, the amplifier and sampling circuit configured to sample data signals from the free fall sensor based on an initial sampling signal and based on a variable sampling signal;

a sampling data analyzer in communication with the amplifier and sampling circuit, the sampling data analyzer configured to compare a magnitude of a sampled data point to a predetermined magnitude and to output an alert signal when the magnitude of the sampled data point is below the predetermined magnitude; and a sampling clock generator in communication with the amplifier and sampling circuit, the sampling clock generator configured to send the initial sampling signal to the amplifier and sampling circuit, and to send the variable sampling signal to the amplifier and sampling circuit in response to the alert signal, wherein the variable sampling signal has different frequencies and different durations that vary between different pairs of pulses of the variable sampling signal.

2. The information handling system of claim 1 further comprising:

a read/write head coupled to the sampling data analyzer, the read/write head configured to suspend read/write operations and lock down in response to a lock down signal from the sampling data analyzer; and a hard disk drive in communication with the read/write head, the hard disk drive configured to store data associated with the read/write operations of the read/write head.

3. The information handling system of claim 2 further comprising:

a head control circuit in communication with the sampling data analyzer and the read/write head, the head control circuit configured to cause the read/write head to lock down in response to the lock down signal from the sampling data analyzer.

4. The information handling system of claim 3 wherein the sampling data analyzer is further configured to output the lock down signal when the counter buffer is at the high voltage level when a counter timer expires.

5. The information handling system of claim 1 further comprising:

a speaker in acoustical communication with the free fall sensor, the speaker configured to amplify audio in a low frequency range.

6. The information handling system of claim 5 wherein the low frequency range is substantially equal to the initial frequency of the sampling signal.

7. The information handling system of claim 1 wherein the second duration between the second plurality of pulses of the variable sampling signal is more than the first duration between the first plurality of pulses of the initial sampling signal.

8. The information handling system of claim 1 wherein the second duration between the second plurality of pulses of the variable sampling signal is less than the first duration between the first plurality of pulses of the initial sampling signal.

9. A method for preventing a false free fall detection in a free fall sensing system of an information handling system, the method comprising:

receiving a data signal from a free fall sensor;

sampling the data signal based on an initial sampling signal;

determining that a first magnitude of a first sampled data point from the data signal is within an active region, wherein the first sampled data point is based on a first plurality of pulses in the initial sampling signal;

sampling the data signal based on a variable sampling signal in response to the first sampled data point being within the active region;

determining whether a second magnitude of a second sampled data point is within the active region, wherein the second sampled data point is based on a second plurality of pulses in the variable sampling signal, wherein the variable sampling signal has different frequencies and different durations that vary between different pairs of pulses of the variable signal; and locking down a read/write head of a hard disk drive in the information handling system in response to the second sampled data point being within the active region.

10. The method of claim 9 further comprising:

starting a counter timer in response to the alert signal;

setting a counter buffer to a high voltage level in response to the alert signal;

sending a vary sampling request to a sampling clock duration controller; and creating the variable sampling signal based on the vary sampling request.

11. The method of claim 9 wherein the data signal indicates movement in the information handling system or the false free fall detection.

12. The method of claim 9 wherein the false free fall detection is based on vibrations in the information handling system from sound generated in the information handling system.

13. The method of claim 9 wherein the initial sampling signal has a fixed frequency and a fixed duration between the first plurality of pulses of the initial sampling signal.

14. The method of claim 9 wherein the first magnitude of the first sampled data point from the data signal is within the active region when the first magnitude of the first sampled data point is below a predetermined magnitude.

15. The method of claim 9 wherein the first magnitude of the first sampled data point from the data signal is within the active region when the first magnitude of the first sampled data point is above a predetermined magnitude.

16. A method for preventing a false free fall detection in a free fall sensing system of an information handling system, the method comprising:

receiving a data signal from a free fall sensor;

sampling the data signal based on an initial sampling signal, wherein the initial sampling signal has a fixed frequency and a fixed duration between a first plurality of pulses of the initial sampling signal;

determining that a first magnitude of a first sampled data point from the data signal is below a predetermined magnitude, wherein the first sampled data point is based on the first plurality of pulses in the initial sampling signal;

sending an alert signal to a monitor unit when the first magnitude of the first sampled data point is below the predetermined magnitude;

creating a variable sampling signal in response to the alert signal;

sampling the data signal based on the variable sampling signal in response to the alert signal;

determining whether a second magnitude of a second sampled data point is below the predetermined magnitude, wherein the second sampled data point is based on the second plurality of pulses in the variable sampling signal, wherein the variable sampling signal has different frequencies and different durations that vary between different pairs of pulses of the variable signal;

determining whether a counter timer has expired; and locking down a read/write head of a hard disk drive in the information handling system in response to the second sampled data point being below the predetermined magnitude when the counter timer has expired.

17. The method of claim 16 further comprising:

starting the counter timer in response to the alert signal; and setting a counter buffer to a high voltage level in response to the alert signal.

18. The method of claim 16 wherein the data signal indicates movement in the information handling system or the false free fall detection.

19. The method of claim 16 wherein the false free fall detection is based on vibrations in the information handling system from sound generated in the information handling system.

20. The method of claim 16 wherein the first magnitude of the first sampled data point from the data signal is within the active region when the first magnitude of the first sampled data Hpoint is below the predetermined magnitude.

* * * * *